(12) United States Patent
Wu et al.

(10) Patent No.: US 10,789,139 B2
(45) Date of Patent: Sep. 29, 2020

(54) METHOD OF REBUILDING REAL WORLD STORAGE ENVIRONMENT

(71) Applicant: VMware, Inc., Palo Alto, CA (US)

(72) Inventors: Yu Wu, Shanghai (CN); Wenguang Wang, Shanghai (CN); Sifan Liu, Shanghai (CN); Jin Feng, Shanghai (CN)

(73) Assignee: VMWARE, INC., Palo Alto, CA (US)

( * ) Notice: Subject to any disclaimer, the term of this patent is extended or adjusted under 35 U.S.C. 154(b) by 218 days.

(21) Appl. No.: 15/952,229

(22) Filed: Apr. 12, 2018

(65) Prior Publication Data

US 2019/0317870 A1 Oct. 17, 2019

(51) Int. Cl.
| | |
|---|---|
| G06F 11/00 | (2006.01) |
| G06F 11/20 | (2006.01) |
| G06F 3/06 | (2006.01) |
| G06F 9/455 | (2018.01) |
| G06F 9/54 | (2006.01) |

(52) U.S. Cl.
CPC .......... *G06F 11/2069* (2013.01); *G06F 3/065* (2013.01); *G06F 3/067* (2013.01); *G06F 3/0619* (2013.01); *G06F 3/0664* (2013.01); *G06F 9/45558* (2013.01); *G06F 9/54* (2013.01); *G06F 2009/45583* (2013.01); *G06F 2201/815* (2013.01)

(58) Field of Classification Search
CPC .... G06F 11/2069; G06F 3/0619; G06F 3/065; G06F 3/0664; G06F 9/45558; G06F 9/54; G06F 3/067; G06F 2009/45583; G06F 2201/815; G06F 11/3476; G06F 11/0727; G06F 11/0712; G06F 11/0751; G06F 11/0709
USPC ......................................................... 714/19
See application file for complete search history.

(56) References Cited

U.S. PATENT DOCUMENTS

| | | |
|---|---|---|
| 6,996,682 B1 | 2/2006 | Milligan et al. |
| 7,653,833 B1 | 1/2010 | Miller et al. |
| 7,900,206 B1 | 3/2011 | Joshi et al. |
| 2008/0097961 A1 | 4/2008 | Dias et al. |
| 2009/0031302 A1 | 1/2009 | Beigi et al. |
| 2009/0171707 A1* | 7/2009 | Bobak ................ G06Q 10/06 705/7.23 |
| 2009/0241108 A1 | 9/2009 | Edwards et al. |
| 2009/0300605 A1 | 12/2009 | Edwards et al. |
| 2012/0159478 A1 | 6/2012 | Spradlin et al. |
| 2012/0203742 A1 | 8/2012 | Goodman et al. |
| 2012/0233463 A1 | 9/2012 | Holt et al. |
| 2013/0055250 A1 | 2/2013 | Pechanec et al. |

(Continued)

*Primary Examiner* — Yair Leibovich
(74) *Attorney, Agent, or Firm* — Su IP Consulting

(57) ABSTRACT

A method for replicating a first virtual storage system of a customer includes receiving periodically collected configuration data, workload data, service failure data, and management workflow data on the first virtual storage system, creating a first multi-dimensional array of observed variables based on periodically collected data, applying dimensionality reduction to the first multi-dimensional array to determine an artificial variable having a largest variance, determining a smaller, second multi-dimensional array that represents the first multi-dimensional array based on the artificial variable, and building a second virtual storage system to replicate the first virtual storage system based on the second multi-dimensional array.

20 Claims, 7 Drawing Sheets

(56) References Cited

U.S. PATENT DOCUMENTS

| | | |
|---|---|---|
| 2014/0047263 A1 | 2/2014 | Coatney et al. |
| 2015/0212856 A1 | 7/2015 | Shanmuganathan et al. |
| 2016/0048408 A1 | 2/2016 | Madhu et al. |
| 2017/0019291 A1* | 1/2017 | Tapia ............... G06N 20/00 |
| 2017/0060900 A1 | 3/2017 | Marinov et al. |
| 2017/0322827 A1 | 11/2017 | Little et al. |
| 2018/0048712 A1 | 2/2018 | Sarisky et al. |
| 2018/0225311 A1 | 8/2018 | Bandopadhyay et al. |
| 2019/0012211 A1 | 1/2019 | Selvaraj |
| 2019/0044823 A1 | 2/2019 | Soundararajan et al. |
| 2019/0068476 A1 | 2/2019 | Ranjit et al. |
| 2019/0266072 A1 | 8/2019 | Ge et al. |
| 2019/0317787 A1* | 10/2019 | Wu ............... G06F 9/45558 |
| 2019/0324785 A1 | 10/2019 | Weissman et al. |

\* cited by examiner

400

```xml
<vc>
  <dataCenter>
    <cluster>
      <dataStore>
        <moId>datastore-35</moId>
        <name>vsanDatastore</name>
        <type>vsan</type>
        <capacity>979719921664</capacity>
      </dataStore>
      <host>
        <moId>host-33</moId>
        <vSwitch>
          <name>vSwitch0</name>
          <mtu>1500</mtu>
          <pnic>
            <key>key-vim.host.PhysicalNic-vmnic0</key>
          </pnic>
        </vSwitch>
        <pnic>
          <device>vmnic0</device>
          <key>key-vim.host.PhysicalNic-vmnic0</key>
          <driver>ne1000</driver>
        </pnic>
        <vnic>
          <device>vmk0</device>
          <key>key-vim.host.VirtualNic-vmk0</key>
          <mtu>1500</mtu>
        </vnic>
        <product>
          <build>10468564</build>
          <vendor>VMware, Inc</vendor>
          <version>6.6.2</version>
        </product>
        <networkSystem>
          <moId>networkSystem-33</moId>
        </networkSystem>
        <vsanSystem>
          <moId>vsanSystem-33</moId>
          <diskMapping>
            <ssd>
              <capacity>
                <block>104857600</block>
                <blockSize>512</blockSize>
              </capacity>
              <formatVersion>6.0</formatVersion>
              <vendor>VMware</vendor>
            </ssd>
            <nonSsd>
              <disk0>
                <capacity>
                  <block>94371840</block>
                  <blockSize>512</blockSize>
                </capacity>
                <formatVersion>6.0</formatVersion>
                <vendor>VMware</vendor>
              </disk0>
            </nonSsd>
          </diskMapping>
        </vsanSystem>
        <datastore>
          <moId>datastore-35</moId>
        </datastore>
      </host>
      <network>
        <moId>networkSystem-33</moId>
        <pnic>
          <device>vmnic0</device>
          <key>key-vim.host.PhysicalNic-vmnic0</key>
          <driver>ne1000</driver>
        </pnic>
        <vnic>
          <device>vmk0</device>
          <key>key-vim.host.VirtualNic-vmk0</key>
          <mtu>1500</mtu>
        </vnic>
      </network>
      <drs>
        <enable>false</enable>
        <defaultVmBehavior>fullyAutomated</defaultVmBehavior>
        <enableVmBehaviorOverrides>true</enableVmBehaviorOverrides>
      </drs>
    </cluster>
  </dataCenter>
</vc>
```

FIG. 4

METHOD OF REBUILDING REAL WORLD STORAGE ENVIRONMENT

CROSS-REFERENCE TO RELATED APPLICATION

The present application is related in subject matter to U.S. patent application Ser. No. 15/952,263, filed Apr. 13, 2018, which is incorporated herein by reference.

BACKGROUND

Through virtualization, virtual machines with different operating systems may run on the same physical machine. Each virtual machine (VM) is provisioned with virtual resources that provide similar functions as the physical hardware of a physical machine, such as central processing unit (CPU), memory, and network resources, to run an operating system and applications.

VMware vSphere is suite of virtualization software for implementing and managing virtual infrastructures. The software include (1) ESXi hypervisor that implements VMs on physical hosts, (2) virtual storage area network (vSAN) that pools and shares local storage across a cluster of ESXi hosts, (3) vCenter Server that centrally provisions and manages vSphere objects such as virtual datacenters, VMs, ESXi hosts, clusters, datastores, and virtual networks, and (4) vSphere Web Client (server) that allows web browser access to the vCenter Server. The vSAN software may be implemented as part of the ESXi hypervisor software.

A typical vSphere virtual infrastructure consists of basic physical building blocks such as x86 host computers, storage networks and arrays, IP networks, a management server, and desktop clients.

Host computers—Industry standard x86 server computers run the ESXi hypervisor on the bare metal. Similarly configured x86 server computers with connections to the same network and storage subsystems can be grouped to create a cluster with an aggregate set of resources in the virtual environment, which enables vSphere High Availability (HA), vSphere Distributed Resource Scheduler (DRS), and the VMware vSAN features.

Storage networks and arrays—Fibre Channel storage area network (SAN) arrays, iSCSI SAN arrays, and network-attached storage (NAS) arrays are widely used storage technologies supported by VMware vSphere to meet different data center storage needs. The storage arrays are connected to and shared between groups of host computers through storage area networks. This arrangement allows aggregation of the storage resources and provides more flexibility in provisioning them to virtual machines.

IP networks—Each host computer can have multiple physical network adapters to provide high bandwidth and reliable networking to the entire VMware vSphere data center.

Management server—vCenter Server provides a single point of control to the data center. It provides essential data center services such as access control, performance monitoring, and configuration. It unifies the resources from the individual host computers to be shared among virtual machines in the entire data center. It manages the assignment of virtual machines to the host computers and the assignment of resources to the virtual machines within a given host computer. These assignments are based on the policies that the system administrator sets.

Management clients—VMware vSphere provides several interfaces for data center management and virtual machine access. These interfaces include vSphere Web Client for access through a web browser or vSphere Command-Line Interface (vSphere CLI).

The vSAN software uses the concept of a disk group as a container for solid-state drives (SSDs) and non-SSDs, such as hard disk drives (HDDs). On each node that contributes storage to a vSAN cluster, the node's local drives are organized into one or more disk groups. Each disk group includes one SSD that serves as read cache and write buffer, and one or more non-SSDs that serve as permanent storage. The aggregate of the disk groups from all the nodes form a vSAN datastore distributed and shared across the nodes.

vSAN introduces a converged storage-compute platform where VMs are running on ESXi hosts as usual while a small percentage of CPU and memory resources is used to serve the storage needs of the same VMs. vSAN enables administrators to specify storage attributes, such as capacity, performance, and availability, in the form of simple policies on a per-VM basis.

Using the vSphere Web Client or a command line interface (CLI), an administrator accesses the vCenter Server to configure and manage vSAN clusters. To create a vSAN cluster, the administrator creates a new cluster, enables vSAN for the cluster, adds hosts to the cluster, adds drives on the clustered hosts (nodes) to a vSAN datastore, and creates a vSAN network that connects the nodes over a physical network (e.g., creates a vSwitch with a VMkernel port enabled with vSAN traffic on each node). Instead of creating a new host cluster, the administrator can also enable vSAN on an existing host cluster. The administrator creates a VM storage policy that defines storage requirements, such as capacity, performance, and availability supported by the vSAN datastore, for a VM and its virtual disks. When the administrator deploys the VM storage policy on a particular VM, the vSAN software places the VM in the vSAN datastore based on the storage requirement of the policy.

BRIEF DESCRIPTION OF THE DRAWINGS

FIG. 4 is an XML file of collected user data on the virtual infrastructure of FIGS. 1 and 2 in some examples of the present disclosure.

DETAILED DESCRIPTION

Figure 1:
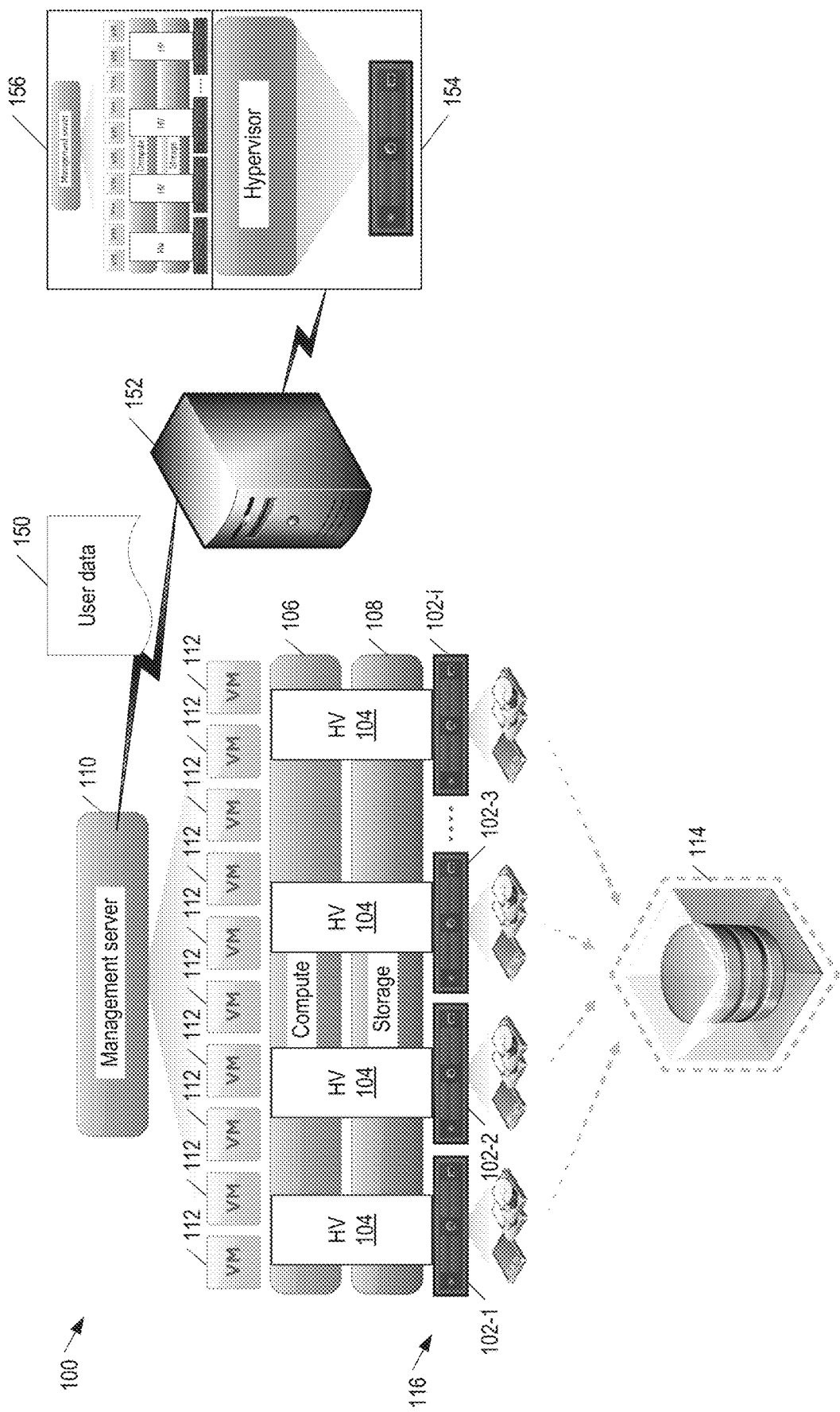
FIG. 1 is a block diagram illustrating a simplified view of a virtual infrastructure with software-defined shared storage in examples of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

In virtualization, there is often a mismatch between the production environment and the development or test environment. Differences between the environments are exacerbated by the complicated configuration of the management server (e.g., vCenter Server), and together they cause some bugs to be overlooked during development and testing of virtualization software.

Software engineers may learn about production environments via support requests. When a customer has an issue with virtualization software, they send a support request (SR) to its vendor and the vendor's engineers will try to replicate and debug the issue locally. However, it is difficult to reproduce the issue locally because the SR lacks sufficient configuration information about the customer's virtual infrastructure. To replicate the customer's virtual infrastructure, particularly its virtual storage system, the engineers would need information about configurations, runtime workload, management workflow, and accidents like power outages and system crashes.

In some examples of the present disclosure, a customer's virtual infrastructure is replicated from user data collected from the customer's management server. The user data includes configuration and information of the management server, such as its virtual datacenters, clusters, hosts, networks, storage, and VMs. A customizable manifest specifies the user data to be collected. From the collected data, the virtual infrastructure's hierarchy is determined and replicated using nested virtualization in another virtual environment. VMs in the replicated infrastructure is loaded with test workload for debugging purposes.

Rebuilding customer virtual infrastructures allows software engineers to resolve SRs with high efficiency. More importantly, it gives the engineers access to production environments to discover bugs before they are reported by the customer.

In some examples of the present disclosure, a customer's virtual storage system is replicated from user data collected from the virtual storage system. A data collection system runs on the virtual storage system to collect user data, such as hardware and software configurations, runtime workloads, management workflow, and service failures. Based on the collected data, a vendor system replicates the customer's virtual storage system using nested virtualization in another virtual environment. As the collected data may span months or even years, the vendor system extracts a short duration of the data that reflects the important characteristics of the original data and reproduces the virtual storage system with the hardware and software configurations, runtime workloads, management workflow, and service failures in the extracted data.

FIG. 1 is a block diagram illustrating a simplified view of a virtual infrastructure 100 with software-defined shared storage in examples of the present disclosure. Virtual infrastructure 100 includes hosts 102-1, 102-2, 102-3, and 102-*i* (collectively "hosts 102" or individually as a generic "host 102") running hypervisors 104 to provide a compute virtualization layer 106 and a storage virtualization layer 108. A management server 110 centrally provisions and manages (1) VMs 112 on compute virtualization layer 106 and (2) a clustered datastore 114 (e.g., a vSAN datastore) on storage virtualization layer 108. Hosts 102 make up nodes of a storage cluster 116 (e.g., a vSAN cluster). Nodes 102 contribute local storage resources (e.g., SSDs and non-SSDs) that form clustered datastore 114. Nodes 102 share clustered datastore 114 to store VMs 112 as objects with object components distributed across the nodes. Virtual infrastructure 100 may be a VMware vSphere data center, hypervisor 104 may be VMware vSphere ESXi hypervisor embedded with vSAN, management server 110 may be VMware vCenter Server, clustered datastore 114 may be a vSAN datastore, and storage cluster 116 may be a vSAN cluster.

Figure 2:
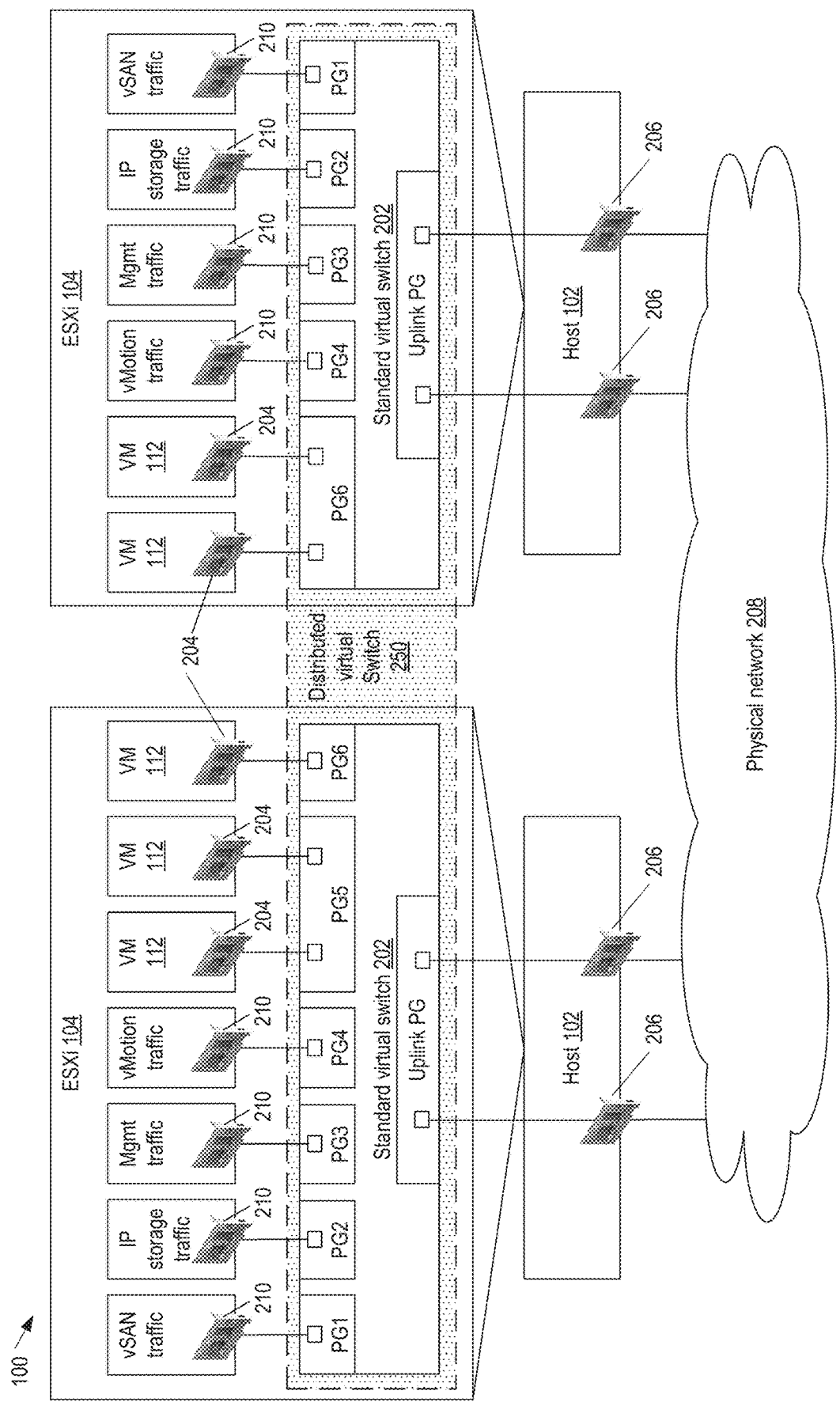
FIG. 2 is a block diagram illustrating virtual networking in the virtual infrastructure of FIG. 1 in examples of the present disclosures.

FIG. 2 is a block diagram illustrating virtual networking in virtual infrastructure 100 in examples of the present disclosures. Virtual infrastructure 100 may include standard virtual switches 202 (e.g., a vSphere Standard Switch also known as "vss" or "vSwitch"). A standard virtual switch 202 is like a physical Ethernet switch. VMs 112 have virtual network adapters (vNICs) 204 connected to ports on standard virtual switch 202. Each port on standard virtual switch 202 is a member of a single VM port group, which provides connectivity and common network configuration for VMs. For example, a port group 5 (PG5) connects two VMs 112 on the same host, and a port group 6 (PG6) connects one VM on one host and two VMs on another host. A VMkernel adapter (vmkNic) 210 may be added to standard virtual switch 202 to handle host management traffic. Additional VMkernel adapters 210 may be added to handle live migration of VMs (e.g., vMotion), network storage (iSCSI) traffic, fault tolerance (FT) traffic (not shown), or virtual storage (e.g., vSAN) traffic. Physical network adapters (pNIC) 206 on hosts 102 are connected to uplink ports of standard virtual switch 202 to provide connectivity to an external physical network 208.

In addition to or as an alternative to standard virtual switch 202, virtual infrastructure 100 may include a distributed virtual switch 250 (e.g., a vSphere Distributed Switch also known as "vds"). Distributed virtual switch 250 is set up on management server 110, and its settings are propagated to all hosts 102 that are associated with the switch. This allows the virtual networking to be administered on a data center level. Distributed virtual switch 250 has distributed port groups to provide network connectivity to VMs 112 and accommodate VMkernel traffic. Distributed virtual switch 250 also has an uplink port group to provide connectivity to external physical network 208.

Figure 3:
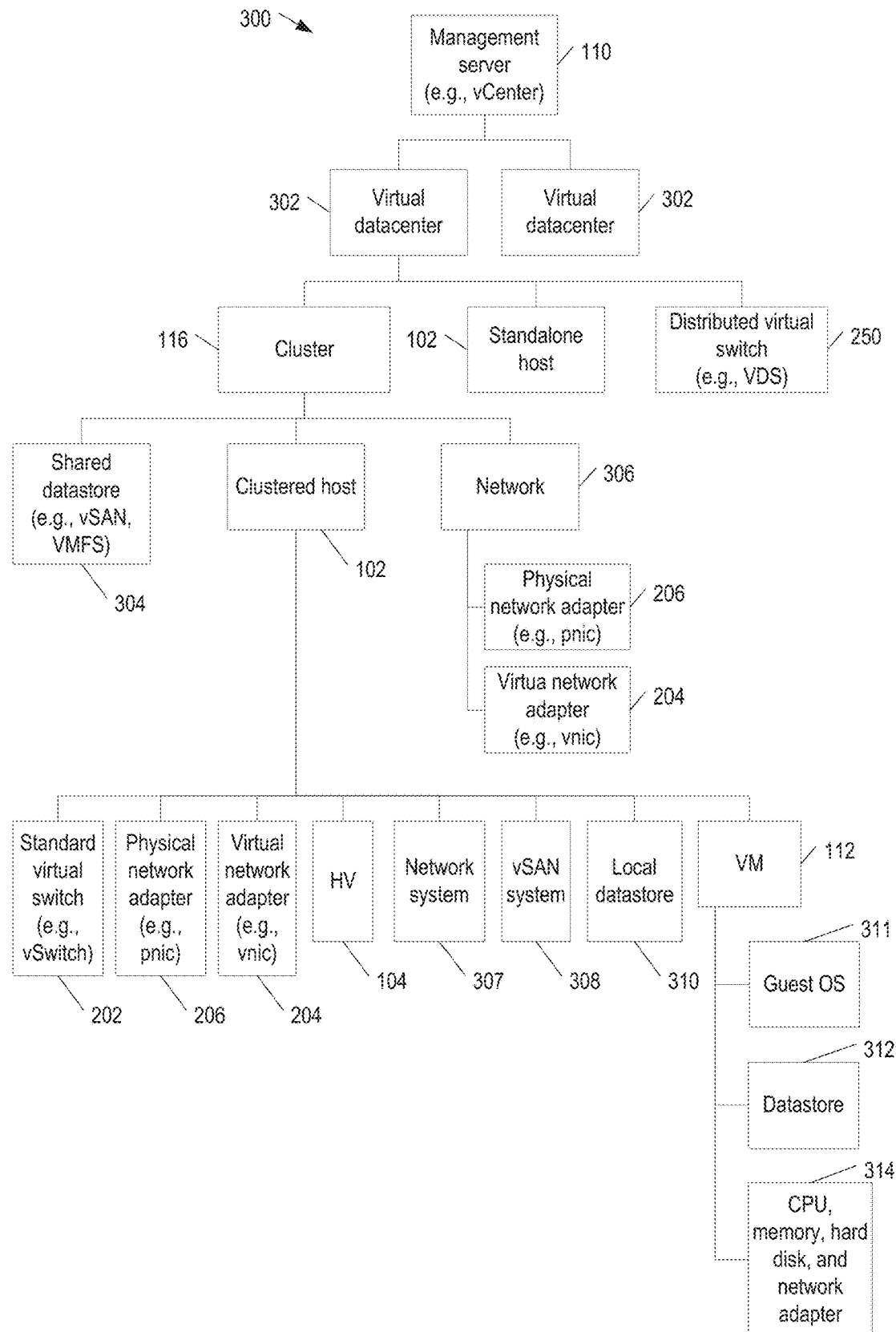
FIG. 3 is a block diagram illustrating a hierarchy of objects in the virtual infrastructure of FIGS. 1 and 2 in some examples of the present disclosure.

FIG. 3 is a block diagram illustrating a hierarchy 300 of objects in virtual infrastructure 100 (FIGS. 1 and 2) in some examples of the present disclosure. Hierarchy 300 starts with management server 110 at the root. Management server 110 includes one or more virtual datacenters 302. A virtual datacenter 302 is a container for objects required to complete a fully functional environment for operating VMs. A virtual datacenter 302 includes zero or more clusters 116, zero or more non-clustered (standalone) hosts 102, and zero or more distributed virtual switches 250.

A cluster 116 enables vSphere High Availability (HA), vSphere Distributed Resource Scheduler (DRS), and the VMware vSAN features. A cluster 116 includes one or more clustered datastores 304, a network 306, and clustered hosts 102. Clustered datastore 304 may be a vSAN datastore (e.g., vSAN datastore 114 in FIG. 1) or a VMFS datastore.

Network 306 specifies host network systems (including their physical network adapter and virtual network adapter) in cluster 116.

A clustered host 102 includes one or more standard virtual switches 202, one or more physical network adapters 206, one or more virtual network adapters 204, hypervisor 104, network system 307, vSAN system 308, local datastore 310, and VMs 112.

A standard virtual switch 202 specifies one or more physical network adapters 206 as its uplinks.

A VM 112 includes a guest OS 311, a datastore 312, and virtual hardware 314

Referring to FIG. 1, in some examples of the present disclosure, a customer's virtual infrastructure 100 is replicated from user data 150 collected from the customer's management server 110. Management server 110 periodically collects user data 150 according to a manifest, which may be customized by customer or vendor. User data 150 includes all related configuration and information about management server 110, such as its virtual datacenters, clusters, hosts, networks, storage, and VMs. Management server 110 sends collected data 150 in a data-interchange format, such as JavaScript Object Notation (JSON), to a vendor system 152. Vendor system 152 converts the collected data from JSON to eXtensible Markup Language (XML) to represent hierarchy 300 (FIG. 3) of virtual infrastructure 100.

FIG. 4 is an XML file 400 of collected data 150 in some examples of the present disclosure. XML file 400 represents hierarchy 300 (FIG. 3) of virtual infrastructure 100.

A virtual datacenter 302 has properties such as its host name and port, and user name and password for accessing the virtual datacenter.

A cluster 116 may have properties such as DRS and HA settings. DRS settings may include its enablement, default VM behavior, and enablement of VM behavior override. HA settings (not shown) include its enablement, admission enablement, failover level, enhanced vMotion compatibility (EVC) mode, VM component protection, VM protection level, VM reaction after APD timeout, and delay VM failover for APD minute.

A clustered datastore 304 has properties such as its managed object ID (moID), name, type (e.g., vSAN), and capacity.

A clustered host 102 has properties such as its moID.

A standard virtual switch 202 has properties such as its name, maximum transport unit (MTU), physical network adapter 206 (identified by its key) to a physical network, and port groups and their virtual network adapter 204 and VMkernel adapter 210.

A physical network adapter 206 has properties such as its device name, key, and driver.

A virtual network adapter 204 has properties such as its device name, key, and MTU.

A hypervisor 104 has properties such as its build, vendor, and version.

A network system 307 has properties such as its moID.

A vSAN system 308 has properties such as its moID and disk mapping to SSD and non-SSD. Each SSD and non-SSD has properties such as its capacity, format version, and vendor.

A network 306 has properties such as a host network system's moID, physical network adapter 206, and virtual network adapter 204.

A non-clustered host 102 has properties similar to a clustered host 102 except for the cluster-related properties.

A distributed virtual switch 250 (not shown) has properties such as i name, version, MTU, number of uplink ports, port groups and their virtual network adapter 204 and VMkernel adapter 210, and hosts 102 with the switch. Each port group has properties such as its name, VLAN ID, and number of ports.

Referring to FIG. 1, vendor system 152 reproduces hierarchy 300 of virtual infrastructure 100 by replicating management server 110 and its managed objects (physical and virtual) in a virtual environment 154. Vendor system 152 provides replicated virtual infrastructure 156 with original properties in the customer's virtual infrastructure 100. For example, vendor system 152 creates replicated virtual infrastructure 156 using vSphere software development kit (SDK). A test workload is run on the replicated VMs for debugging purposes.

Figure 5:
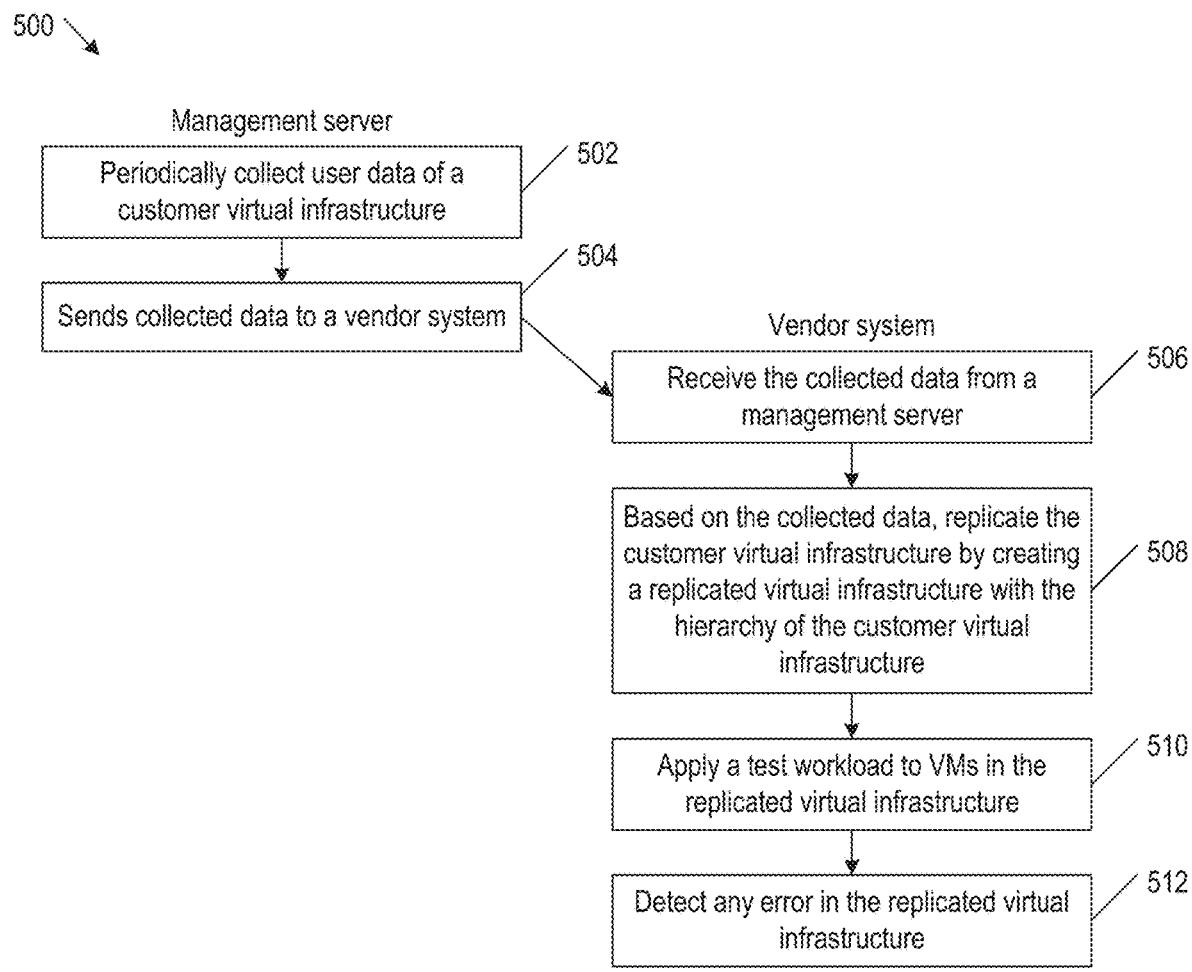
FIG. 5 is a block diagram illustrating a flowchart of a method to implement a management server and a vendor system of FIG. 1 in some examples of the present disclosure.

FIG. 5 is a block diagram illustrating a flowchart of a method 500 to implement management server 110 and vendor system 152 (FIG. 1) in some examples of the present disclosure. Method 500, and any method described herein, may be implemented as instructions encoded on a computer-readable medium that is to be executed by a processor in a computer system. Method 500, and any method described herein, may include one or more operations, functions, or actions illustrated by one or more blocks. Although the blocks are illustrated in sequential orders, these blocks may also be performed in parallel, and/or in a different order than those described herein. In addition, the various blocks may be combined into fewer blocks, divided into additional blocks, and/or eliminated based upon the desired implementation. Method 500 may begin in block 502.

In block 502, management server 110 periodically collects user data 150 (e.g., configuration data) of customer virtual infrastructure 100 based on a customizable manifest specifying the types of data to be collected. The manifest may be changed by customer or vendor. Collected data 150 may include configurations of a virtual datacenter managed by management server 110, a cluster in the virtual datacenter, clustered hosts in the cluster, a standard virtual switch in each clustered host, a distributed virtual switch in the virtual datacenter, and one or more un-clustered hosts in the virtual datacenter. Block 502 may be followed by block 504.

In block 504, management server 110 sends collected data 150 to vendor system 152. Block 504 may be followed by block 506.

In block 506, vendor system 152 receives collected data 150 from management server 110. Block 506 may be followed by block 508.

In block 508, based on collected data 150, vendor system 152 replicates customer virtual infrastructure 100 by creating a replicated virtual infrastructure 156 (FIG. 1) with the hierarchy of the customer virtual infrastructure. Vendor system 152 may use nested virtualization to create replicated virtual infrastructure 156 in a virtual environment. Specifically, vendor system 152 configures a management server in replicated virtual infrastructure 156 with the configuration of management server 110, and the vendor system implements the clustered and un-clustered hosts in customer virtual infrastructure 100 with VMs in the virtual environment. Block 508 may be followed by block 510.

In block 510, vendor system 152 applies a test workload to the VMs in replicated virtual infrastructure 156. Block 510 may be followed by block 512.

In block 512, vendor system 152 detects any error in replicated virtual infrastructure 156 for debugging purposes.

Figure 6:
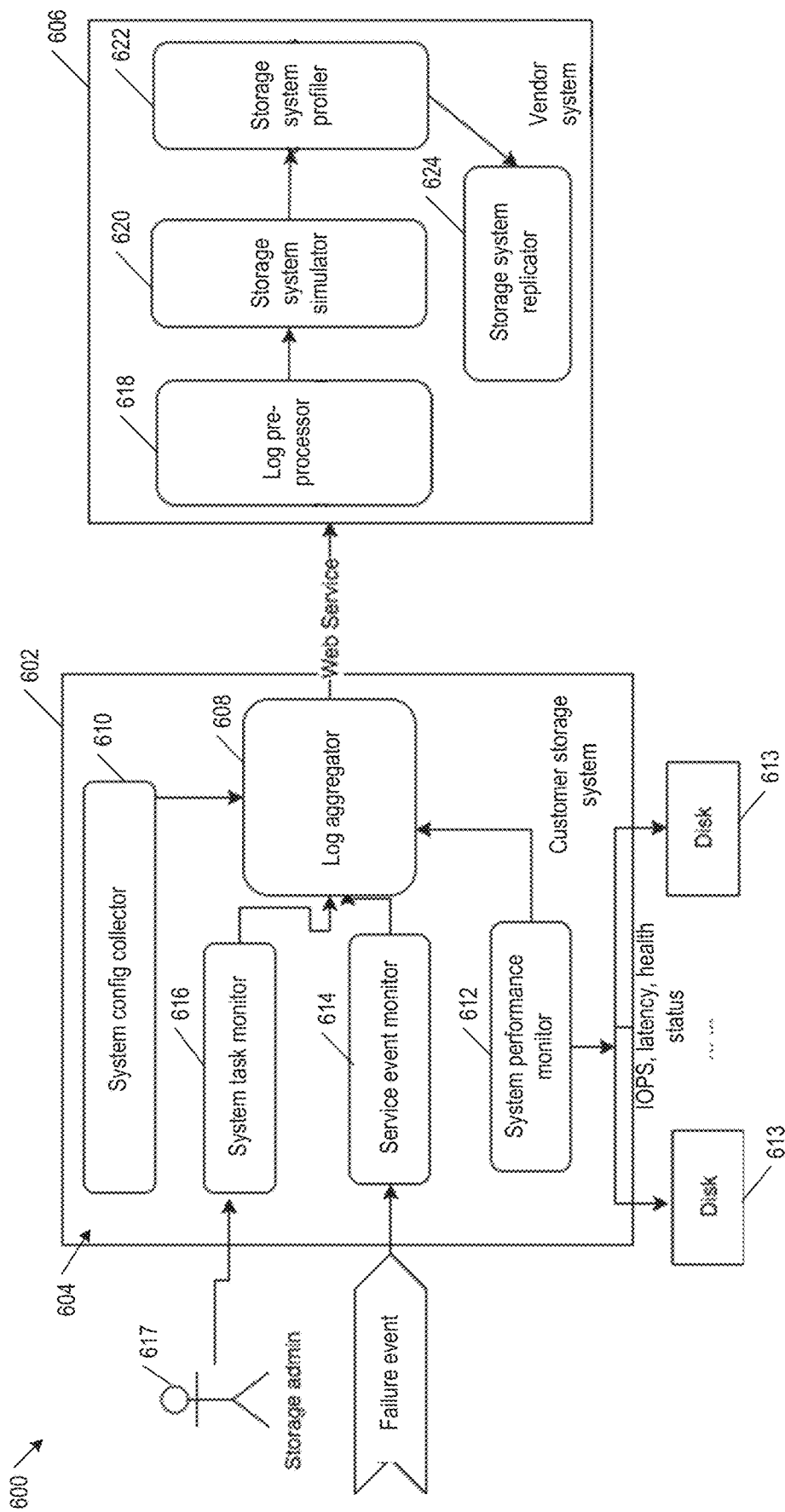
FIG. 6 is a block diagram illustrating a system to rebuild a customer storage system in some examples of the present disclosure.

FIG. 6 is a block diagram illustrating a system 600 to rebuild a customer storage system 602 in some examples of the present disclosure. System 600 includes a user data collection system 604 (running on customer storage system 602) and a vendor system 606. Customer storage system 602 may be virtual infrastructure 100 (FIG. 1) and vendor system 606 may be vendor system 152 (FIG. 1).

User data collection system 604 runs on a management server (e.g., management server 110 in FIG. 1) of customer storage system 602 to collect the necessary user data without taking too much system storage space and computing resources. User data collection system 604 includes a log aggregator 608, a system configuration collector 610, a system performance monitor 612, a service event monitor 614, a system task monitor 616.

Log aggregator 608 sends logs generated by system configuration collector 610, system performance monitor 612, service event monitor 614, system task monitor 616 to vendor system 606.

System configuration collector 610 and system performance monitor 612 periodically collect system configurations (denoted as "H") and runtime workloads (denoted as "U"), respectively, and store them in a system configuration log and a system performance log, respectively, with the proper timestamps. System configurations H include software and hardware configurations of customer storage system 602. For example, system configurations H are those described earlier in reference to FIG. 3 and FIG. 4. Runtime workloads U include input/output per second (IOPS) and latency of storage devices 613 like HDD, SSD, and SAN. Runtime workloads U also include latency and throughput of one or more physical networks between hosts (e.g., one physical network for vSphere vSAN traffic and another for user traffic to read and write to a vSAN datastore). System configuration log and the system performance log may be small since they may not vary much over time and can therefore be well compressed.

Service event monitor 614 collects service failure events (denoted as "E") and stores them in a service event log with the proper timestamps. Service event monitor 614 includes multiple types of monitors to detect different types of failure events E. Service event monitor 614 may include a network monitor, host failure monitor, and a disk failure monitor. The network monitor detects network connectivity issues inside customer storage system 602 and records them as network failure events. The host failure monitor detects host shutdowns and reboots (e.g., caused by power failure or host service failure) and records them as host failure events. The disk failure monitor detects disk failures and records them as disk failure events. Service event monitor 614 record network failure events, host failure events, and disk failure events in the service event log with the proper timestamps. Service event monitor 614 may also integrate existing monitor systems in customer storage system 602 to report any of kind of service failure event and send back to vendor system 606.

System task monitor 616 collects a management workflow of storage related management tasks (denoted as "M") performed by a storage administrator 617. The existing monitor systems in customer storage system 602 records application programming interface (API) invocations and their executions in an API invocation and execution log. To save space, system task monitor 616 filters the API invocation and execution log to retrieve the storage related management tasks performed by storage administrator 617. Storage administrator 617 may be a specific role or refer to a general administrator that performs storage related management tasks. System task monitor 616 first identifies storage administrator 617 and then records API invocations performed by the administrator and their executions in a management workflow log. System task monitor 616 identifies a storage administrator by performing the following on the API invocation and execution log.

For each caller session in the API invocation and execution log, system task monitor 616 records a mapping between the user caller session and a client ID. A client ID is a combination of client connection IP address, client API version, and client type (e.g., the UI browser type and version), which is assumed to be associated with one real user. Such information can be fetched from hypertext transport protocol (HTTP) request to customer storage system 602.

For each caller session in the API invocation and execution log, system task monitor 616 records a mapping between the user caller session and a user name and privileges. System task monitor 616 fetches the user name and privilege when a user first logs in the management server of customer storage system 602 with his or her token and password.

System task monitor 616 assigns a unique operation ID for each API invocation propagating the entire execution path. In other words, a task or operation initiated by an API invocation is given an operation ID and subsequent API invocations issued in response to the first API invocation are given the same operation ID in order to identify the task or operation. System task monitor 616 records a mapping between the user session and the operation IDs.

System task monitor 616 then determines a mapping between client ID and API invocations performed under the client ID {client ID: API invocations} by aggregating the three maps {operation ID: API invocations}, {user session: operation ID}, {client ID: user session}. For each client ID, system task monitor 616 determines it belongs to a storage administrator when (1) the user has privileges to perform the storage management tasks and (2)(a) the user has executed some storage related management tasks (e.g., scheduling backup) or (2)(b) most of the invoked API (e.g., >50%) is not read-only for customer storage system 602 (e.g., enabling encryption or deduplication).

After identifying storage administrator 617, system task monitor 616 may further filter out the read-only API invocations and unimportant management API invocations performed by the storage administrator from the API invocation and execution log so the log is a manageable size and retains details such as API signatures, parameters, and execution results. As a storage administrator (or the client ID) may change, system task monitor 616 may repeat the above process to determine a new storage administrator if the current storage administrator takes no action for a given threshold period of time (e.g., one day).

Vendor system 606 aims to rebuild customer storage system 602 by simulating the real-world environment as much as possible in limited time (e.g., in a few hours or days) and with limited resource (e.g., using nested virtualization) since the customer storage system may have been running for a long time (e.g., months or years). Vendor system 606 includes a log preprocessor 618, a storage system simulator 620, a storage system profiler 622, and a storage system replicator 624.

Log preprocessor 618 validates the logs received from log aggregator 608, categorizes them, and combine logs of the same type (e.g., appending new log to old log of the same type). Log preprocessor 618 passes the logs to storage system simulator 620.

Storage system simulator 620 extracts a multi-dimensional array [(H1, U1, E1/M1, T1)] from the logs as they record four kinds of data (H, U, E, and M). For example, an entry identifies a management task (M1) or a service failure event (E1) at time T1 with storage system configuration H1 and runtime workload U1. To find storage system configuration H1 and runtime workload U1 at time T1, storage system simulator 620 retrieves the last recorded storage system configuration H and runtime workload U before time T1.

Storage system simulator 620 may further process the multi-dimensional array by assigning a unique ID for each type of management tasks and service failure events, and changing time T1 for management task M1 or service failure event E1 to a time difference between the time of the current management task M1/service event failure E1 and the time of the very first management task M1/service failure event E1.

Note system configurations H and runtime workloads U each represents many factors but for simplicity is shown as a single factor in the multi-dimensional array. Further note that the multi-dimensional array may be long when it covers months or years of data. Storage system simulator 620 passes the multi-dimensional array to storage system profiler 622.

Storage system profiler 622 extracts key characteristics from the long multi-dimensional array to determine how to trim the array. To extract the key characteristics, storage system profiler 622 applies dimensionality reduction to the multi-dimensional array. Dimensionality reduction may be feature extraction or feature selection. Feature extraction may be principal component analysis (PCA).

In some examples of the present disclosure, storage system profiler 622 applies PCA to the multi-dimensional array to determine the artificial variable having the largest variance. Storage system profiler 622 then determines one of the observed variables (H1, U1, E1/M1, T1) that contributes the most to the artificial variable. This observed variable is considered the most important variable.

Storage system profiler 622 next finds a pattern for the most important variable in the multi-dimensional array. For example, assume the multi-dimensional array consists [(1, 2, 1, 1), (1, 3, 1, 1), (1, 2, 1, 1), (1, 4, 1, 1), (1, 2, 1, 1) . . . ] and the second observed variable is the most important factor. Storage system profiler 622 creates a first one-dimensional array of the most important factor (e.g., the second factor), such as [2, 3, 2, 4, 2, . . . ], and then extracts a smaller, second one-dimensional array that is most similar to the first one-dimensional array. The length of the second one-dimensional array depends on the available time and resources for testing. Storage system profiler 622 may extract candidates of a given length from the first one-dimensional array. The candidates may or may not overlap in the first one-dimensional array. For each candidate, storage system profiler 622 may compare the candidate with portions of the first one-dimensional array with the given length and sum the differences as a score for the candidate. The portions may or may not overlap in the first one-dimensional array. Storage system profiler 622 may use a similarity evaluation algorithm like Damerau-Levenshtein distance or Hamming distance to determine similarity between the one-dimensional arrays.

Based on the smaller, second one-dimensional array, storage system profiler 622 extracts a corresponding smaller multi-dimensional array from the original multi-dimensional array. Storage system profiler 622 passes the smaller multi-dimensional array to storage system replicator 624.

Storage system replicator 624 processes the entries in the smaller multi-dimensional array according to their chronological order. For each entry, storage system replicator 624 rebuilds customer storage system 602 with the system configuration at the given time in a virtualized environment and applies the runtime workload on the replicated storage system (e.g., replicated virtual structure 156 in FIG. 1) at the given time. Storage system replicator 624 then performs the management task or injects the service failure event at the given time. This way storage system replicator 624 can almost exactly replicate the real-world storage environment.

Vendor system 606 may receive user data from collection systems 604 on many customer storage systems 602. Vendor system 606 may apply a valuation function to automatically (without human intervention) select a customer storage system 602 to replicate with a test case (i.e., a multi-dimensional array). The valuation function may be based on the impacted customers, their service levels, the ability of the test case to reproduce customer bugs, and differentiation from other test cases. A test case has greater value if it impacts many customers, those customers are important as they have paid for higher levels of service, the set of user data is able to reproduce customer bugs, and the set of user data is very different from other test cases. A test case that is very different from other test cases indicates it is new and can improve coverage of the real-world environment. The differentiation between test cases may be determined using a similarity evaluation algorithm like Damerau-Levenshtein distance or Hamming distance.

Figure 7:
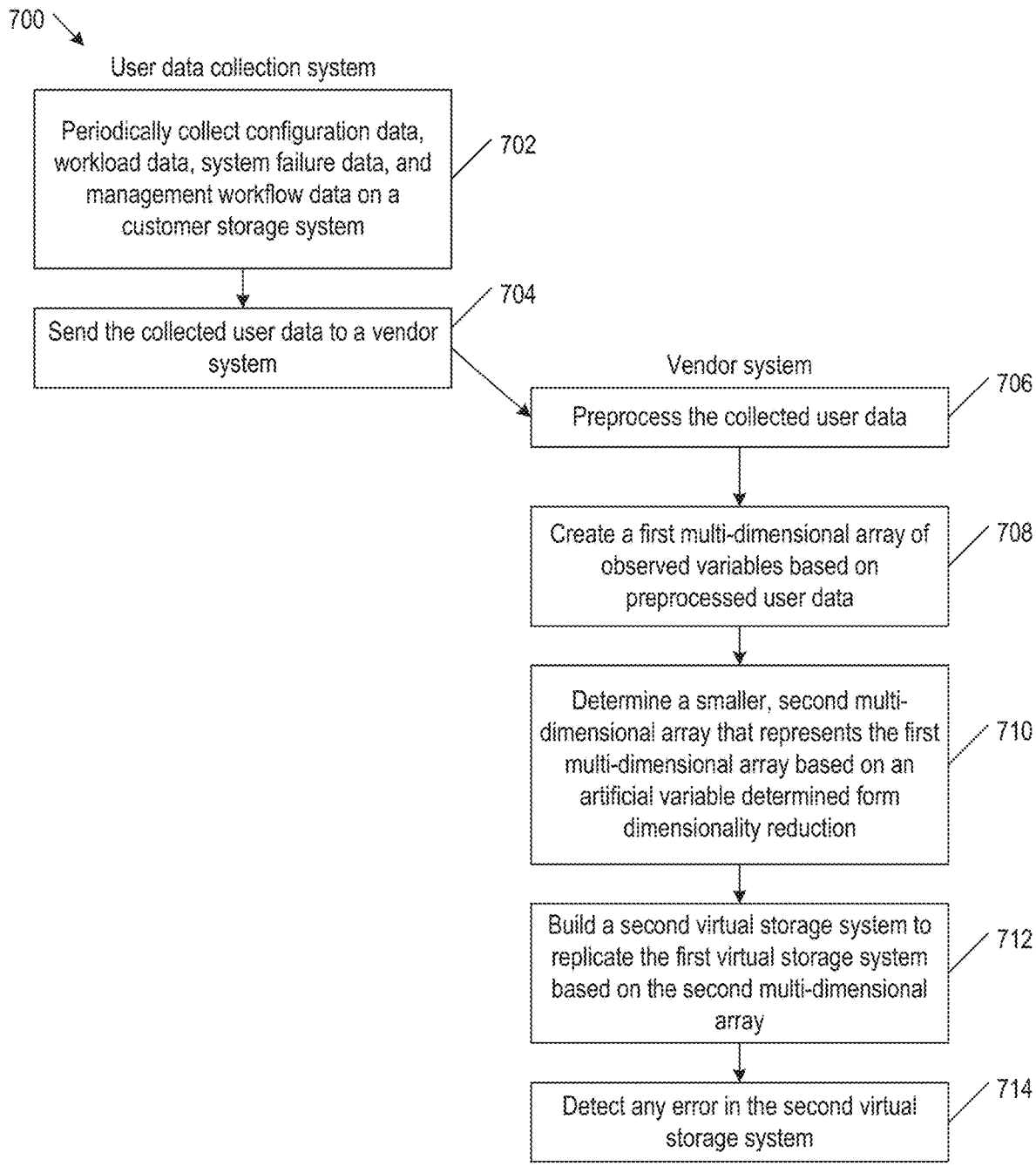
FIG. 7 is a block diagram illustrating a flowchart of a method to implement a user data collection system and vendor system of FIG. 6 in some examples of the present disclosure.

FIG. 7 is a block diagram illustrating a flowchart of a method 700 to implement user data collection system 604 and vendor system 606 (FIG. 6) in some examples of the present disclosure. Method 700 may begin in block 702.

In block 702, user data collection system 604 periodically collects user data on customer storage system 602 (FIG. 6). For example, user data collection system 604 includes system configuration collector 610 (FIG. 6) to collect configuration data, system performance monitor 612 (FIG. 6) to collect workload data, service event monitor 614 (FIG. 6) to collect service failure data, and a system task monitor 616 (FIG. 6) to collect management workflow data. As described above, system task monitor 616 collects the management workflow data by determining an administrator of customer virtual storage system 602 and recording storage related management tasks performed by the administrator. Block 702 may be followed by block 704.

In block 704, user data collection system 604 sends the collected user data to vendor system 606. For example, user data collection system 604 includes a log aggregator 608 (FIG. 6) that sends the collected user data (in the form of logs) to vendor system 606. Block 704 may be followed by block 706.

In block 706, vendor system 606 preprocesses the collected user data. For example, vendor system 606 includes log preprocessor 618 (FIG. 6) validates the logs received from log aggregator 608, categorizes them, and combines logs of the same type (e.g., appending new log to old log of the same type). Block 706 may be followed by block 708.

In block 708, vendor system 606 creates a first multi-dimensional array of observed variables based on preprocessed user data. For example, vendor system 606 includes storage system simulator 620 (FIG. 6) that extracts the first multi-dimensional array [(H1, U1, E1/M1, T1)] from the logs. To find storage system configuration H1 and runtime workload U1 at time T1, storage system simulator 620 retrieves the last recorded storage system configuration H and runtime workload U before time T1. Storage system simulator 620 may further process the first multi-dimensional array by assigning a unique ID for each type of management tasks and service failure events, and changing time T1 for management task M1 or service failure event E1 to a time difference between the time of the current management task M1/service failure event E1 and the time of the previous management task M1/service failure event E1. Block 708 may be followed by block 710.

In block 710, vendor system 606 determines a smaller, second multi-dimensional array that represents the first multi-dimensional array based on an artificial variable determined from dimensionality reduction. For example, vendor system 606 includes storage system profiler 622 (FIG. 6) that applies dimensionality reduction to the first multi-dimensional array to determine the artificial variable having the largest variance. Storage system profiler 622 next determines a smaller, second one-dimensional array that is most like the first one-dimensional array, and then determines determining a second multi-dimensional array corresponding to the second one-dimensional array. Block 710 may be followed by block 712.

In block 712, vendor system 606 builds a second virtual storage system to replicate the first virtual storage system based on the second multi-dimensional array. For example, vendor system 606 includes storage system replicator 624 (FIG. 6) that creates the second virtual storage system based on the configuration data in the second multi-dimensional array, applies the workloads data in the second multi-dimensional array to the second storage system, injects the service failure data in the second multi-dimensional array to the second virtual storage system, and injects the management workflow data in the second multi-dimensional array to the second virtual storage system. Block 712 may be followed by block 714.

In block 714, vendor system 606 detects any error in the second virtual storage system.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A method for replicating a first virtual storage system of a customer, the method comprising:
   receiving periodically collected configuration data, workload data, service failure data, and management workflow data on the first virtual storage system;
   creating a first multi-dimensional array of observed variables based on the configuration data, the workload data, the service failure data, and the management workflow data;
   applying dimensionality reduction to the first multi-dimensional array to determine an artificial variable having a largest variance;
   determining a smaller, second multi-dimensional array that represents the first multi-dimensional array based on the artificial variable;
   building a second virtual storage system to replicate the first virtual storage system based on the second multi-dimensional array, comprising:
   creating the second virtual storage system based on the configuration data in the second multi-dimensional array;
   applying the workload data in the second multi-dimensional array to the second virtual storage system;
   applying the service failure data in the second multi-dimensional array to the second virtual storage system;
   applying the management workflow data in the second multi-dimensional array to the second virtual storage system; and
   detecting any error in the second virtual storage system.

2. The method of claim 1, further comprising collecting the configuration data, the workload data, the service failure data, and the management workflow data on the first virtual storage system from a server.

3. The method of claim 2, wherein the configuration data comprise hardware and software configuration data of the first virtual storage system, the workload data comprise input/output operations per second (IOPS) and latency of storage devices, and latency and throughput of one or more physical networks between hosts in the first virtual storage system, the service failure data comprise network failures, host failures, and disk failures, and the management workflow data comprise management tasks.

4. The method of claim 2, wherein said collecting the management workflow data comprises determining an administrator of the first virtual storage system and recording management tasks by the administrator.

5. The method of claim 4, wherein said determining an administrator comprises:
   creating a first map between a user caller session and a client ID;
   creating a second map between the user caller session and a user name and its privileges;
   creating a third map between API invocations and the user caller session;
   creating a fourth map between the client ID and the API invocations by combining the first, the second, and the third maps;
   determining if a user of the client ID (1) has privileges to perform management tasks and (2) has performed at least some management tasks or a percentage of the API invocations above a threshold comprises non-read management tasks.

6. The method of claim 1, wherein said creating a first multi-dimensional array comprises representing each datum with a time difference from a first datum.

7. The method of claim 1, wherein said applying dimensionality reduction comprises applying feature extraction or feature selection.

8. The method of claim 7, wherein said applying feature extraction comprises applying principal component analysis.

9. The method of claim 8, wherein said determining a smaller, second multi-dimensional array that represents the first multi-dimensional array based on the artificial variable comprises:
   creating a first one-dimensional array of an observable variable with a largest coefficient in a first principal component;
   determining a smaller, second one-dimensional array that is most like the first one-dimensional array; and
   determining the second multi-dimensional array corresponding to the second one-dimensional array.

10. The method of claim 9, wherein said determining a smaller, second one-dimensional array that is most like the first one-dimensional array is based on a Damerau-Levenshtein distance or a Hamming distance.

11. A computer system, comprising:
    a first site, comprising:

a log preprocessor of the computer system configured to receive periodically collected configuration data, workload data, service failure data, and management workflow data on a first virtual storage system at a second site;

a storage system simulator of the computer system configured to create a first multi-dimensional array of observed variables based on the configuration data, the workload data, the service failure data, and the management workflow data;

a storage profiler of the computer system configured to:
apply dimensionality reduction to the first multi-dimensional array to
determine an artificial variable having a largest variance; and
determine a smaller, second multi-dimensional array that represents the first multi-dimensional array based on the artificial variable;

a storage system replicator of the computer system configured to build a second virtual storage system to replicate the first virtual storage system based on the second multi-dimensional array by:
creating the second virtual storage system based on the configuration data in the second multi-dimensional array;
applying the workload data in the second multi-dimensional array to the second virtual storage system;
applying the service failure data in the second multi-dimensional array to the second virtual storage system;
applying the management workflow data in the second multi-dimensional array to the second virtual storage system; and
detecting any error in the second virtual storage system.

12. The computer system of claim 11, further comprising a second site implementing the first virtual storage system, the second site comprising:
hosts and hypervisors running on the hosts that implement the first virtual storage system;
a system configuration collector running on a server managing the first virtual storage system and configured to collect the configuration data;
a system task monitor running on the server and configured to collect the management workflow data;
a service event monitor running on the server and configured to collect the service failure data;
a system performance monitor running on the server and configured to collect the workload data; and
a log aggregator running on the server and receiving logs from the system configuration collector, the system task monitor, the service event monitor, and the system performance monitor and transmitting the logs over a computer network to the log preprocessor at the first site.

13. The computer system of claim 12, wherein the configuration data comprise hardware and software configuration data of the first virtual storage system, the workload data comprise input/output operations per second (IOPS) and latency of storage devices, and latency and throughput of one or more physical networks between hosts in the first virtual storage system, the service failure data comprise network failures, host failures, and disk failures, and the management workflow data comprise management tasks.

14. The computer system of claim 12, wherein said collect the management workflow data comprises the system task monitor being configured to determine an administrator of the first virtual storage system and recording management tasks by the administrator.

15. The computer system of claim 14, wherein said determine an administrator comprises the system task monitor being configured to:
create a first map between a user caller session and a client ID;
create a second map between the user caller session and a user name and its privileges;
create a third map between API invocations and the user caller session;
create a fourth map between the client ID and the API invocations by combining the first, the second, and the third maps; and
determine if a user of the client ID (1) has privileges to perform management tasks and (2) has performed at least some management tasks or a percentage of the API invocations above a threshold comprises non-read management tasks.

16. The computer system of claim 11, wherein said create a first multi-dimensional array comprises a storage system modeler being configured to represent each datum with a time difference from a preceding datum.

17. The computer system of claim 11, wherein said apply dimensionality reduction comprises the storage profiler being configured to apply principal component analysis.

18. The computer system of claim 17, wherein said determine a smaller, second multi-dimensional array that represents the first multi-dimensional array based on the artificial variable comprises the storage profiler being configured to:
create a first one-dimensional array of an observable variable with a largest coefficient in a first principal component;
determine a smaller, second one-dimensional array that is most like the first one-dimensional array; and
determine the second multi-dimensional array corresponding to the second one-dimensional array.

19. The computer system of claim 18, wherein said determine a smaller, second one-dimensional array that is most like the first one-dimensional array is based on a Damerau-Levenshtein distance or a Hamming distance.

20. A non-transitory, computer-readable storage medium encoded with instructions executable by a processor to replicate a first virtual storage system of a customer, the instructions comprising:
receiving periodically collected configuration data, workload data, service failure data, and management workflow data on the first virtual storage system;
creating a first multi-dimensional array of observed variables based on the configuration data, the workload data, the service failure data, and the management workflow data;
applying dimensionality reduction to the first multi-dimensional array to determine an artificial variable having a largest variance;
determining a smaller, second multi-dimensional array that represents the first multi-dimensional array based on the artificial variable;
building a second virtual storage system to replicate the first virtual storage system based on the second multi-dimensional array, comprising:
creating the second virtual storage system based on the configuration data in the second multi-dimensional array;

applying the workload data in the second multi-dimensional array to the second virtual storage system;

applying the service failure data in the second multi-dimensional array to the second virtual storage system;

applying the management workflow data in the second multi-dimensional array to the second virtual storage system; and detecting any error in the second virtual storage system.

* * * * *

UNITED STATES PATENT AND TRADEMARK OFFICE
CERTIFICATE OF CORRECTION

PATENT NO. : 10,789,139 B2  
APPLICATION NO. : 15/952229  
DATED : September 29, 2020  
INVENTOR(S) : Yu Wu et al.

Page 1 of 1

It is certified that error appears in the above-identified patent and that said Letters Patent is hereby corrected as shown below:

On the Title Page

Item (72), under "Inventors," in Column 1, Line 2, delete "Shanghai (CN)" and insert -- Santa Clara, CA --, therefor.

Signed and Sealed this  
Twenty-second Day of December, 2020

Andrei Iancu  
*Director of the United States Patent and Trademark Office*